(12) United States Patent
Wang et al.

(10) Patent No.: US 11,318,548 B2
(45) Date of Patent: May 3, 2022

(54) RESISTANCE SPOT BRAZING WORKPIECE STACK-UPS HAVING ONE OR MORE THIN-GAUGE STEEL WORKPIECES

(71) Applicant: GM GLOBAL TECHNOLOGY OPERATIONS LLC, Detroit, MI (US)

(72) Inventors: Pei-chung Wang, Troy, MI (US); Michael J. Karagoulis, Okemos, MI (US); Zhenke Teng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 607 days.

(21) Appl. No.: 15/952,645

(22) Filed: Apr. 13, 2018

(65) Prior Publication Data

US 2019/0314914 A1    Oct. 17, 2019

(51) Int. Cl.
*B23K 1/00* (2006.01)
*B23K 11/31* (2006.01)
*B23K 11/11* (2006.01)

(52) U.S. Cl.
CPC .......... *B23K 1/0004* (2013.01); *B23K 11/115* (2013.01); *B23K 11/31* (2013.01)

(58) Field of Classification Search
CPC .. B23K 20/16; B23K 2103/10; B23K 35/002; B23K 11/00; B23K 11/115; B23K 11/185; B23K 2101/18; B23K 35/001; B23K 35/286; B23K 11/16; B23K 11/18; B23K 11/36; B23K 1/0004; B23K 20/021; B23K 20/023; B23K 20/026; B23K 20/2333; B23K 20/2336; B23K 20/24; B23K 2103/12; B23K 26/037; B23K 26/211; B23K 26/244; B23K 35/02; B23K 35/0255; B23K 35/0261; B23K 9/24; H01L 2224/32225; H01L 2224/48091;

(Continued)

(56) References Cited

U.S. PATENT DOCUMENTS 5,961,853 A * 10/1999 Thornton ............. B23K 1/0004
219/85.14
6,107,595 A * 8/2000 Peterson ................. B23K 11/11
219/117.1

(Continued)

FOREIGN PATENT DOCUMENTS

CN      104259610 A    1/2015
EP      0756916 A2     2/1997

*Primary Examiner* — Tu B Hoang
*Assistant Examiner* — Vy T Nguyen
(74) *Attorney, Agent, or Firm* — Vivacqua Crane, PLLC (57) ABSTRACT

A method of resistance spot brazing a workpiece stack-up that includes a first thin-gauge steel workpiece and a second thin-gauge steel workpiece. The method includes several steps. A first step involves applying a filler material to a surface of the first thin-gauge steel workpiece. A second step involves bringing a surface of the second thin-gauge steel workpiece to adjoin the filler material. A third step involves clamping a first welding electrode and a second welding electrode on the first and second thin-gauge steel workpieces and over the filler material. A fourth step involves passing electrical current between the first and second welding electrodes and hence through the filler material. And a fifth step involves terminating passage of the electrical current in order to establish a brazed joint between the first and second thin-gauge steel workpieces.

19 Claims, 3 Drawing Sheets

(58) Field of Classification Search
CPC . H01L 2224/48227; H01L 2224/73265; H01L 2924/00; H01L 2924/00014; H01L 2224/48472; Y10T 428/12903; Y10T 29/49936; Y10T 428/1216; Y10T 428/12444; Y10T 428/1275; Y10T 428/12826; Y10T 428/12924; Y10T 428/12972; Y10T 403/479; Y10T 428/12493; Y10T 428/12729; Y10T 428/12736
USPC ............... 219/117.1, 92, 108, 110, 118, 119, 219/121.31, 124.02, 136, 144, 83, 85.14, 219/85.15, 91.2, 93, 94; 428/674, 567, 428/608, 652, 663, 677, 684, 649, 650; 29/521; 228/164, 193, 195, 197, 198, 228/262.5; 429/156, 179
See application file for complete search history.

(56) References Cited

U.S. PATENT DOCUMENTS

| | | | | |
|---|---|---|---|---|
| 2007/0166554 A1* | 7/2007 | Ruchert | .............. | H01L 23/3735 257/E23.106 |
| 2011/0303736 A1* | 12/2011 | Sigler | .................... | B23K 20/16 228/164 |
| 2014/0348576 A1* | 11/2014 | Nakagawa | ......... | B23K 20/2333 228/249 |
| 2014/0367368 A1* | 12/2014 | Yang | .................... | B23K 11/115 219/91.22 |
| 2016/0008911 A1* | 1/2016 | Schroth | ................. | B23K 9/042 219/78.02 |

\* cited by examiner

RESISTANCE SPOT BRAZING WORKPIECE STACK-UPS HAVING ONE OR MORE THIN-GAUGE STEEL WORKPIECES

INTRODUCTION

The present disclosure relates generally to joining metal workpieces together and, more particularly, relates to resistance spot brazing steel workpieces together to establish a brazed joint therebetween.

Resistance spot brazing is a process carried out to join metal workpieces together with the use of a filler material. In general, the filler material is placed between the metal workpieces and is melted from heat generated as the filler material resists the flow of electrical current being passed through it.

The automotive industry joins together metal workpieces during the manufacture of vehicle closure components such as hoods, trunk lids, and lift gates, but has done so largely by way of a more traditional resistance spot welding process that lacks a filler material. But challenges have arisen when resistance spot welding is performed on metal workpieces that are made of steel and that possess a thinner gauge.

SUMMARY

In an embodiment, a method of resistance spot brazing a workpiece stack-up includes several steps. The workpiece stack-up includes a first thin-gauge steel workpiece and a second thin-gauge steel workpiece. One step involves applying a filler material to a first surface of the first thin-gauge steel workpiece. Another step involves bringing the second thin-gauge steel workpiece to the first thin-gauge steel workpiece. A second surface of the second thin-gauge steel workpiece adjoins the filler material. Yet another step involves clamping a first welding electrode and a second welding electrode on the first and second thin-gauge steel workpieces at the filler material. Another step involves passing electrical current between the first and second welding electrodes and through the first and second thin-gauge steel workpieces. The electrical current also passes through the filler material. And yet another step involves terminating the passage of electrical current in order to establish a brazed joint between the first and second thin-gauged steel workpieces.

In an embodiment, the first thin-gauge steel workpiece has a thickness dimension that is less than approximately 0.75 millimeters (mm). And the second thin-gauge steel workpiece has a thickness dimension that is less than approximately 0.75 mm.

In an embodiment, the step of applying the filler material involves coating the first surface of the first thin-gauge steel workpiece with the filler material via thermal spraying.

In an embodiment, the step of applying the filler material involves layering the filler material on the first surface of the first thin-gauge steel workpiece via additive manufacturing.

In an embodiment, layering the filler material on the first surface of the first thin-gauge steel workpiece involves 3D printing.

In an embodiment, the step of applying the filler material to the first surface of the first thin-gauge steel workpiece involves applying the filler material in a paste form.

In an embodiment, the step of applying the filler material to the first surface of the first thin-gauge steel workpiece involves applying the filler material in a wire form.

In an embodiment, the step of applying the filler material to the first surface of the first thin-gauge steel workpiece involves providing the filler material in shim form.

In an embodiment, the filler material is composed of a base metal material with numerous particles dispersed within the base metal material. The particles facilitate the application of the filler material to have a retained thickness dimension before the establishment of the brazed joint.

In an embodiment, the filler material is composed of a base metal material with numerous particles dispersed within the base metal material. The particles facilitate a retained gap dimension between the first and second surfaces at the brazed joint.

In an embodiment, the method of resistance spot brazing the workpiece stack-up also includes depositing numerous particles into a base metal material of the filler material. The particles are dispersed within the base metal material.

In an embodiment, the particles are deposited into the base metal material after the filler material is applied to the first surface of the first thin-gauge steel workpiece and before the second surface of the second thin-gauge steel workpiece is adjoined with the filler material.

In an embodiment, the particles are deposited into the base metal material by thermal spraying.

In an embodiment, the first welding electrode, the second welding electrode, or both of the first and second welding electrodes have a weld face with a radius of curvature that ranges between approximately 25 millimeters (mm) and 50 mm.

In an embodiment, a method of resistance spot brazing a workpiece stack-up includes several steps. One step involves providing a first thin-gauge steel workpiece and providing a second thin-gauge steel workpiece. Another step involves applying a filler material to a first surface of the first thin-gauge steel workpiece. Yet another step involves depositing numerous particles into the applied filler material. And another step involves adjoining a second surface of the second thin-gauge steel workpiece to the filler material. And yet another step involves clamping a first welding electrode and a second welding electrode on the first and second thin-gauge steel workpieces adjacent the filler material. The particles facilitate a retained gap dimension at the filler material between the first and second surfaces as the first and second welding electrodes exert a clamping load thereat. Another step involves passing electrical current between the first and second welding electrodes. And another step involves terminating passage of the electrical current in order to establish a brazed joint between the first and second thin-gauge steel workpieces.

In an embodiment, the step of applying the filler material involves layering the filler material on the first surface of the first thin-gauge steel workpiece via additive manufacturing.

In an embodiment, the step of applying the filler material to the first surface of the first thin-gauge steel workpiece involves applying the filler material in a paste form.

In an embodiment, the step of applying the filler material to the first surface of the first thin-gauge steel workpiece involves applying the filler material in a wire form.

In an embodiment, the step of depositing numerous particles into the applied filler material involves thermal spraying.

In an embodiment, a method of resistance spot brazing a workpiece stack-up includes several steps. One step involves providing a first thin-gauge steel workpiece and providing a second thin-gauge steel workpiece. The first thin-gauge steel workpiece has a thickness dimension that is less than approximately 0.75 millimeters (mm). The second thin-gauge steel workpiece has a thickness dimension that is less than approximately 0.75 mm. Another step involves applying a filler material to a first surface of the first thin-gauge steel workpiece by way of additive manufacturing. Yet another step involves depositing numerous particles into the applied filler material by way of thermal spraying. And another step involves adjoining a second surface of the second thin-gauge steel workpiece to the applied filler material having the deposited particles. And yet another step involves clamping a first welding electrode and a second welding electrode on the first and second thin-gauge steel workpieces adjacent the filler material. The particles facilitate a retained gap dimension at the filler material between the first and second surfaces as the first and second welding electrodes exert a clamping load thereat. Another step involves passing electrical current between the first and second welding electrodes. And another step involves terminating passage of the electrical current in order to establish a brazed joint between the first and second thin-gauge steel workpieces.

BRIEF DESCRIPTION OF THE DRAWINGS

One or more aspects of the disclosure will hereinafter be described in conjunction with the appended drawings, wherein like designations denote like elements, and wherein.

DETAILED DESCRIPTION

The methods and assemblies detailed in this description resolve shortcomings encountered when joining workpiece stack-ups that have thin-gauge steel workpieces. With reference to several embodiments, a resistance spot brazing process is described that more efficiently and effectively joins thin-gauge steel workpieces than previously thought possible. Improved joint quality and improved joint consistency among multiple joints is furnished, and an extended useful life of the associated welding electrodes is realized. The resulting joints have been found to have enhanced strength. These advancements, as well as others described elsewhere, are due in part to the lower temperatures accompanying the resistance spot brazing process compared to traditional resistance spot welding processes, as well as lower localized temperatures with the addition of a filler material, and, in some embodiments, a more readily manageable braze filler thickness and gap size between the thin-gauge steel workpieces at the joint site. Furthermore, the resistance spot brazing process lends itself to use in a mass production environment—such as those customary in automotive manufacturing facilities—more so than previously-known brazing processes. And while the methods and assemblies are described in the context of automotive components, skilled artisans will appreciate that the methods and assemblies are not so limited and can be employed in other contexts such as aerospace, marine, railway, and industrial equipment applications, among others.

Figure 1:
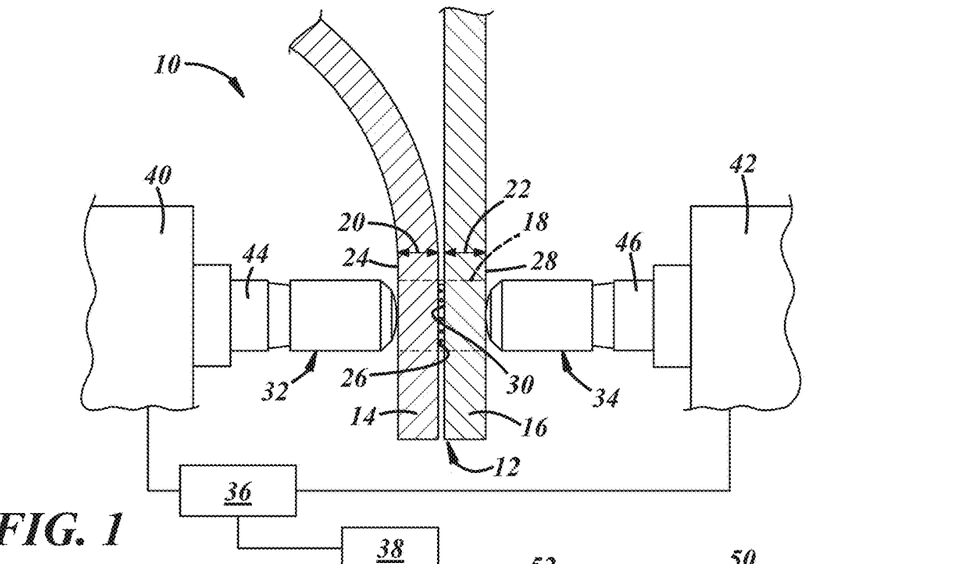
FIG. 1 is a side view of a resistance spot brazing assembly, with a workpiece stack-up depicted in sectional view.

Referring now to FIG. 1, a resistance spot brazing assembly 10 is used in a process to resistance spot braze a workpiece stack-up 12. In the embodiment presented, the workpiece stack-up 12 includes a first thin-gauge steel workpiece 14 and a second thin-gauge steel workpiece 16 that overlap and overlie each other at a braze site 18. The first and second thin-gauge steel workpieces 14, 16 can be composed of the same steel material relative to each other, or can be composed of different steel materials relative to each other. The steel material of the first and second thin-gauge steel workpieces 14, 16 can have various compositions and can take various forms depending on the particular application. In an example, the first and second thin-gauge steel workpieces 14, 16 are composed of a low carbon steel sheet that goes by the material specification GMW2 HD, as designated by the assignee of the present application; still, other compositions are possible in other examples.

The first and second thin-gauge steel workpieces 14, 16 have thinner gauges in the sense that a first thickness 20 of the first thin-gauge steel workpiece 14 measures less than approximately 0.75 millimeters (mm) and, likewise, a second thickness 22 of the second thin-gauge steel workpiece 16 measures less than approximately 0.75 mm. In other examples, the first and second thicknesses 20, 22 can have values that range between approximately 0.4 mm and 0.75 mm, between approximately 0.55 mm and 0.75 mm, or between approximately 0.6 mm and 0.75 mm. Further, the first and second thicknesses 20, 22 can measure approximately 0.4 mm, can measure approximately 0.55 mm, can measure approximately 0.6 mm, or can measure approximately 0.75 mm. Still, other ranges and other values are possible in other examples. The first and second thicknesses 20, 22 can have the same value relative to each other, or can have a different value relative to each other. The first thin-gauge steel workpiece 14 has a first back surface 24 and a first faying surface 26 and, similarly, the second thin-gauge steel workpiece 16 has a second back surface 28 and a second faying surface 30.

Still referring to FIG. 1, in this embodiment the resistance spot brazing assembly 10 includes a first welding electrode 32 and a second welding electrode 34 that pass electrical current between each other and through the workpiece stack-up 12 and through the first and second thin-gauge steel workpieces 14, 16 at the braze site 18. Each of the first and second welding electrodes 32, 34 is carried by a weld gun of suitable type such as a C-type or an X-type weld gun. A power supply 36 delivers electrical current to the first and second welding electrodes 32, 34 according to a programmed weld schedule administered by a weld controller 38. The weld gun can be fitted with coolant lines to deliver a coolant fluid, such as water, to each of the first and second welding electrodes 32, 34 as called for amid resistance spot brazing operations. The weld gun includes a first gun arm 40 and a second gun arm 42. A first shank 44 of the first gun arm 40 secures the first welding electrode 32, and a second shank 46 of the second gun arm 42 secures the second welding electrode 34.

Figure 2:
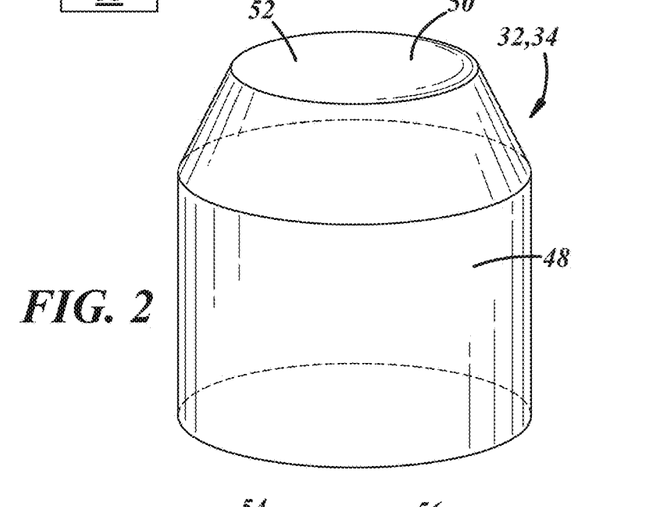
FIG. 2 is a perspective view of a welding electrode that may be used in the resistance spot brazing assembly of FIG. 1.

Referring now to FIG. 2, the first and second welding electrodes 32, 34 can share a similar construction, and are generally made for use with a steel workpiece like the first and second thin-gauge steel workpieces 14, 16. In general, and in an example, the first and second welding electrodes 32, 34 have an electrode body 48 and a weld face 50. The weld face 50 is the portion of the first and second welding electrodes 32, 34 that makes contact with the first and second back surfaces 24, 28 during resistance spot brazing. The weld face 50 has a weld face surface 52 that may be generally planar or spherically domed. If spherically domed, the weld face surface 52 has a spherical profile with a radius of curvature that measures within a range of approximately 25 mm to 100 mm, approximately 25 mm to 50 mm, or approximately 25 mm to 40 mm. Further, the radius of curvature can measure approximately 25 mm, can measure approximately 40 mm, or can measure approximately 50 mm. Still, other ranges and other values are possible in other examples.

In the automotive industry, as well as other industries, joining together steel workpieces in workpiece stack-ups has most commonly been carried out by resistance spot welding processes, and not resistance spot brazing processes. While productive, shortcomings have been found in certain cases in which resistance spot welding is performed on steel workpieces that possess a thinner gauge such as the first and second thin-gauge steel workpieces 14, 16. Suboptimal weld quality has been observed in resistance spot welded joints in thinner gauge steel workpieces; and inconsistencies have been observed, such as varied joint size, among multiple resistance spot welded joints in thinner gauge steel workpieces. Moreover, the useful life of welding electrodes utilized when resistance spot welding thinner gauge steel workpieces has been shown to be diminished compared to utilization in thicker gauge steel workpieces. Without wishing to be confined to a single theory of causation, it is thought that these conditions are the consequence of elevated temperatures experienced amid resistance spot welding of thinner gauge steel workpieces which have been shown to reach approximately 1,500 degrees Celsius (° C.) at an abutment interface between the weld face surfaces 52 of the welding electrodes and the back surfaces 24, 28 of the workpieces. These same elevated temperatures are not always experienced with thicker gauge steel workpieces, as not as much heat typically propagates to the abutment interface between the welding electrodes and workpieces.

Figure 3:
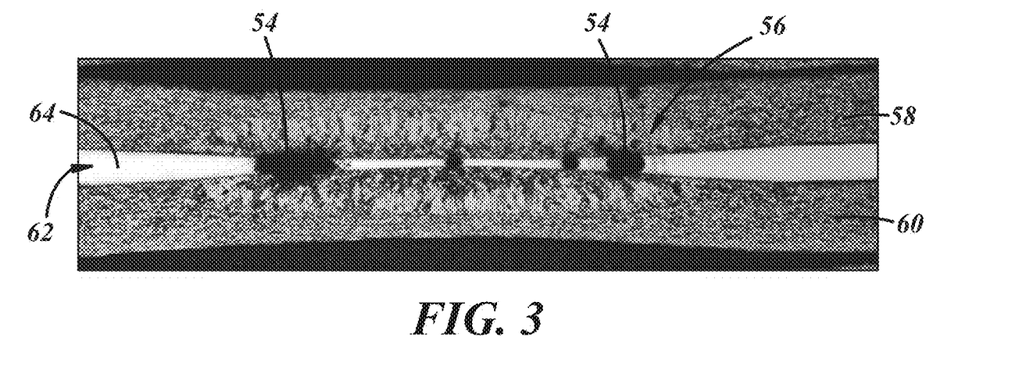
FIG. 3 is a microstructure of a brazed joint of a workpiece stack-up that includes a pair of thin-gauge steel workpieces.

Resistance spot brazing processes for thinner gauge steel workpieces, on the other hand, have not been employed in mass production environments due to the inability to maintain a suitable filler material thickness and gap size between the thinner gauge steel workpieces at the braze site, and due to porosities observed in the established brazed joint, among other possible reasons. The microstructure of FIG. 3 depicts porosities 54 in a brazed joint 56 established between a pair of steel workpieces 58, 60 composed of the low carbon steel designated GMW2 HD. The steel workpieces 58, 60 each have a thickness of about 0.55 mm. An uneven vertical gap 62 of a filler 64 between the steel workpieces 58, 60 is also evident in the depiction of FIG. 3. Approximate process parameters executed for the brazed joint 56 included a welding electrode clamp load of 360 pounds (lbs.), a welding time of twelve milliseconds (ms) at a welding current of 11-15 kiloamps (kA), and a welding time of eight ms at a welding current of 15 kA. It has been determined that the porosities 54 and uneven gap 62 have resulted in suboptimal joint quality and strength, and hence, to date, have deterred employment of resistance spot brazing processes for thinner gauge steel workpieces in mass production environments.

Figure 4:
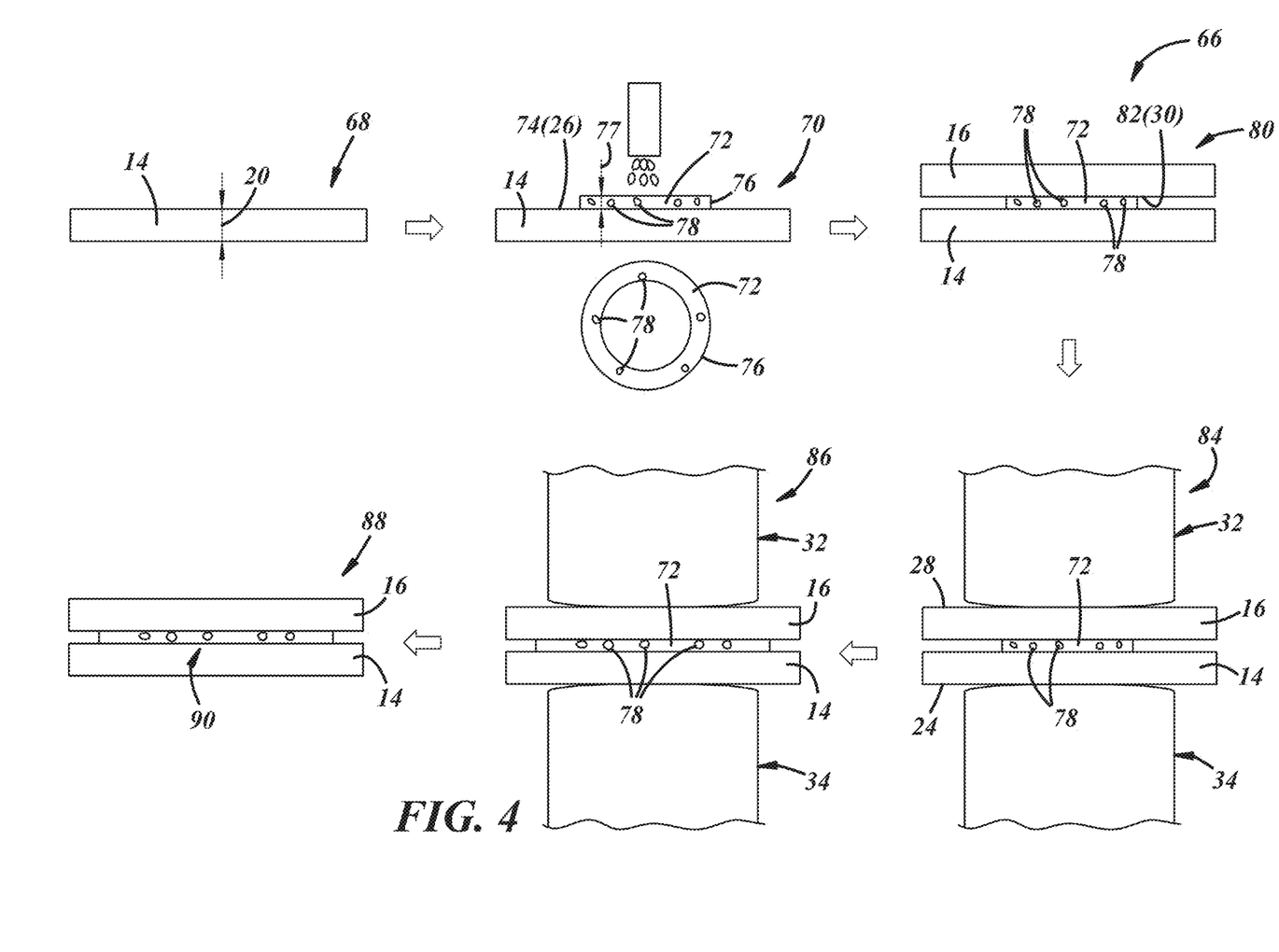
FIG. 4 depicts an embodiment of a method of resistance spot brazing a workpiece stack-up that includes a pair of thin-gauge steel workpieces.

The resistance spot brazing process set forth herein resolves these shortcomings. In different embodiments, the resistance spot brazing process can have more, less, and/or different steps and parameters than those detailed in this description, and the steps can be performed in different orders than described. In the embodiment of FIG. 4, for example, a resistance spot brazing method 66 includes a number of steps. A first step 68 involves providing the first thin-gauge steel workpiece 14. The first thin-gauge steel workpiece 14 can be provided in the forms previously described, including with the first thickness 20 of less than approximately 0.75 mm. The first step 68 can also involve providing the second thin-gauge steel workpiece 16. The second thin-gauge steel workpiece 16 can likewise be provided in the forms previously described, including with the second thickness 22 of less than approximately 0.75 mm.

A second step 70 of the resistance spot brazing method 66 involves applying a filler material 72 to a first surface 74 (in this case, the first faying surface 26) of the first thin-gauge steel workpiece 14. The filler material 72 has a base metal material 76 that can be composed of various metal materials depending in part upon the material compositions of the first and second thin-gauge steel workpieces 14, 16 and compatibility therebetween. When the first and second thin-gauge steel workpieces 14, 16 are made of a low carbon steel, for instance, the base metal material 76 of the filler material 72 can have a composition of copper or copper-zinc, can be iron-base, can be gold-base, can be nickel-based, or can be silver-based. Still, other compositions are possible in other embodiments. The filler material 72 can be applied to the first surface 74 by way of different application technologies and techniques, and in different forms. In an embodiment, the filler material 72 is coated on the first surface 74 via a thermal spraying process in which the filler material 72 is sprayed on the first surface 74 in a molten or semi-molten state. Types of thermal spraying processes that may be suitable in a given embodiment include, but are not limited to, plasma spraying, wire arc spraying, and laser plasma spraying. Still, other types of thermal spraying are possible in other embodiments. Further, the filler material 72 can be layered on the first surface 74 via an additive manufacturing process. In an embodiment, the filler material 72 is added to the first surface 74 layer-upon-layer by 3D printing. Still, other types of additive manufacturing processes are possible in other embodiments. Dictated in part by the application technology and technique, the filler material 72 can take different forms in application. In different embodiments, the filler material 72 is applied to the first surface 74 in a paste form, is applied to the first surface 74 in a wire form, or is applied to the first surface 74 in a shim form. In the shim example, the shim can be applied to the first surface 74 by placement via a mechanical means such as by being carried by a robotic component. Still, other forms are possible in other embodiments.

In the second step 70 of the resistance spot brazing method 66, the filler material 72 can be applied to the first surface 74 in different patterns and with different thicknesses. In certain embodiments, the filler material 72 can be configured in an annular pattern (see, for example, the annular pattern illustrated in FIG. 4 and situated beneath the second step 70 depiction), can be configured in a lined pattern, can be configured in a crossed pattern, can be configured in a solidly-filled pattern, and/or can be configured in a dotted pattern. Still, other patterns are possible in other embodiments. Whatever pattern configuration is prepared, the precise thickness dimension of the filler material 72 applied in this step may be based upon—among other possible influences—maintaining and retaining a desired filler thickness dimension and gap size between the first and second thin-gauge steel workpieces 14, 16 in subsequent steps of the resistance spot brazing method 66, as described more below. In the second step 70, a thickness 77 of the filler material 72 can have a value that ranges between approximately 0.05 mm and 2.0 mm. Still, other ranges are possible in other embodiments. In the same manner, the precise amount of the filler material 72 applied in this step may be based upon—among other possible influences—maintaining and retaining a desired filler thickness dimension and gap size between the first and second thin-gauge steel workpieces 14, 16 in subsequent steps of the resistance spot brazing method 66.

Still referring to FIG. 4, in addition to the base metal material 76, in some embodiments the filler material 72 may have numerous particles 78 dispersed within the base metal material 76. The particles 78 are introduced at least in part to augment the maintenance and retention of a desired filler thickness dimension and gap size between the first and second thin-gauge steel workpieces 14, 16 in subsequent steps of the resistance spot brazing method 66. The particles 78 can be composed of various metal materials depending in part upon the material compositions of the first and second thin-gauge steel workpieces 14, 16 and/or the material composition of the base metal material 76, depending on compatibility therebetween. In an example, the particles 78 are composed of tungsten carbide (WC); still, other compositions are possible in other embodiments. Dispersion of the particles 78 within the base metal material 76 can be effected in various ways. In one embodiment, the particles 78 are dispersed within the base metal material 76 concurrently as the filler material 72 is being applied to the first surface 74 of the first thin-gauge steel workpiece 14. In another embodiment, the particles 78 are deposited into the filler material 72 after the filler material 72 has been applied to the first surface 74 and may still be in a molten or semi-molten state. Here, the deposition of the particles 78 may constitute a separate step of the larger resistance spot brazing method 66. The particles 78 can be deposited into the base metal material 76 of the filler material 72 by way of different deposition technologies and techniques. In an embodiment, the particles 78 are deposited into the base metal material 76 via a thermal spraying process in which the particles 78 are sprayed into the base metal material 76, themselves in a molten or semi-molten state. Types of thermal spraying processes that may be suitable in a given embodiment include, but are not limited to, plasma spraying, wire arc spraying, and laser plasma spraying. Still, other types of thermal spraying are possible in other embodiments.

A third step 80 of the resistance spot brazing method 66 involves bringing the second thin-gauge steel workpiece 16 to the first thin-gauge steel workpiece 14 and over the applied filler material 72. A second surface 82 (in this case, the second faying surface 30) of the second thin-gauge steel workpiece 16 comes into direct abutment with, and adjoins, the filler material 72. In this step, the first and second thin-gauge steel workpieces 14, 16 overlap and overlie each other with the filler material 72 sandwiched therebetween. A fourth step 84 of the resistance spot brazing method 66 involves clamping the first and second welding electrodes 32, 34 on the first and second thin-gauge steel workpieces 14, 16 at the braze site 18 and over the sandwiched filler material 72. In this step, the first and second welding electrodes 32, 34 exert a clamping load on the first and second thin-gauge steel workpieces 14, 16 and thus to the filler material 72. Further, a fifth step 86 of the resistance spot brazing method 66 involves passing electrical current between the first and second welding electrodes 32, 34 and through the first and second thin-gauge steel workpieces 14, 16 and through the filler material 72. And a sixth step 88 of the resistance spot brazing method 66 involves terminating and ceasing the passage of electrical current exchanged between the first and second welding electrodes 32, 34. A brazed joint 90 is hence established from the filler material 72 and between the first and second thin-gauge steel workpieces 14, 16.

As described, the resistance spot brazing method 66 resolves the shortcomings encountered when joining thinner gauge steel workpieces like the first and second thin-gauge steel workpieces 14, 16. Because resistance spot brazing processes are performed at lower temperatures than resistance spot welding processes (i.e., in some cases as much as 1,200° C. lower), the suboptimal weld quality and inconsistencies previously observed and due to elevated temperatures in resistance spot welding thinner gauge steel workpieces are minimized, or altogether precluded, by the resistance spot brazing method 66. Moreover, the addition of the filler material 72 has proven to lower the localized temperatures in the fifth step 86 at the abutment interfaces between the weld face surfaces 52 of the first and second welding electrodes 32, 34 and the first and second back surfaces 24, 28 of the first and second thin-gauge steel workpieces 14, 16. The filler material 72 raises the number of faying interfaces present in the workpiece stack-up 12 (i.e., a first faying interface is produced between the first faying surface 26 and the confronting and opposed surface of the filler material 72, and a second faying interface is produced between the second faying surface 30 and its respectively confronting and opposed surface of the filler material 72) compared to a workpiece stack-up lacking the filler material 72. The greater number of faying interfaces offers greater electrical resistance amid the fifth step 86 which can increase and may concentrate the localized temperatures thereat, and may more readily initiate and establish a brazed joint like the brazed joint 90. Further, in at least some embodiments, a minute gap can exist between the filler material 72 and the respective first and second faying surfaces 26, 30, at the first and second faying interfaces, which again offers greater electrical resistance amid the fifth step 86. In some cases, this means that a weld schedule with a more abbreviated weld current duration can be employed. Still, the localized temperatures in the fifth step 86 at the abutment interfaces can be lowered in yet another way. The addition of the filler material 72 results in an addition to the overall thickness of the workpiece stack-up 12. A central point of heat propagation is hence displaced to a central region of the filler material 72, as opposed to the central point being situated at the first and second faying surfaces 26, 30. In this way, the degree of heat that propagates to the abutment interfaces is reduced. Correspondingly, the useful life of the first and second welding electrodes 32, 34 are not so diminished and experience a lesser degree of wear when utilized in the resistance spot brazing method 66, compared to utilization in resistance spot welding.

Moreover, it has been found that maintaining and retaining a desired filler thickness dimension and gap size between the first and second thin-gauge steel workpieces 14, 16 improves braze joint overall quality and strength. In an example, the desired filler dimension and gap size can have values that range between approximately 0.01 mm and 2.0 mm; still, other ranges are possible in other embodiments. Clamping loads exerted on the first and second thin-gauge steel workpieces 14, 16 by the first and second welding electrodes 32, 34 has a tendency to decrease the filler thickness dimension and gap size by, in some instances, squeezing the filler material 72 which may still be in a molten or semi-molten state. This may result in a more uneven filler thickness dimension and gap size than preferred, like the uneven gap 62 evident in the microstructure of FIG. 3. The resistance spot brazing method 66 alleviates this tendency, at least to some extent, by one or more of the embodiments described. Having the radius of curvature of the weld face surface 52 within the ranges and values set forth above has been shown to help maintain and retain a desired filler thickness dimension and gap size. Likewise, the pattern configuration of the filler material 72 prepared, the thickness dimension of the filler material 72 applied, and/or the amount of the filler material 72 applied, have been shown singly or in combination to help maintain and retain a desired filler thickness dimension and gap size. The particles 78 too have been shown to help in this regard. Moreover, the unwanted impact of porosities in an established brazed joint are less pronounced when a desired filler thickness dimension and gap size are maintained and retained. In these ways, a more readily manageable resistance spot brazing process is achieved and can more readily be adopted in mass production environments.

Figure 5:
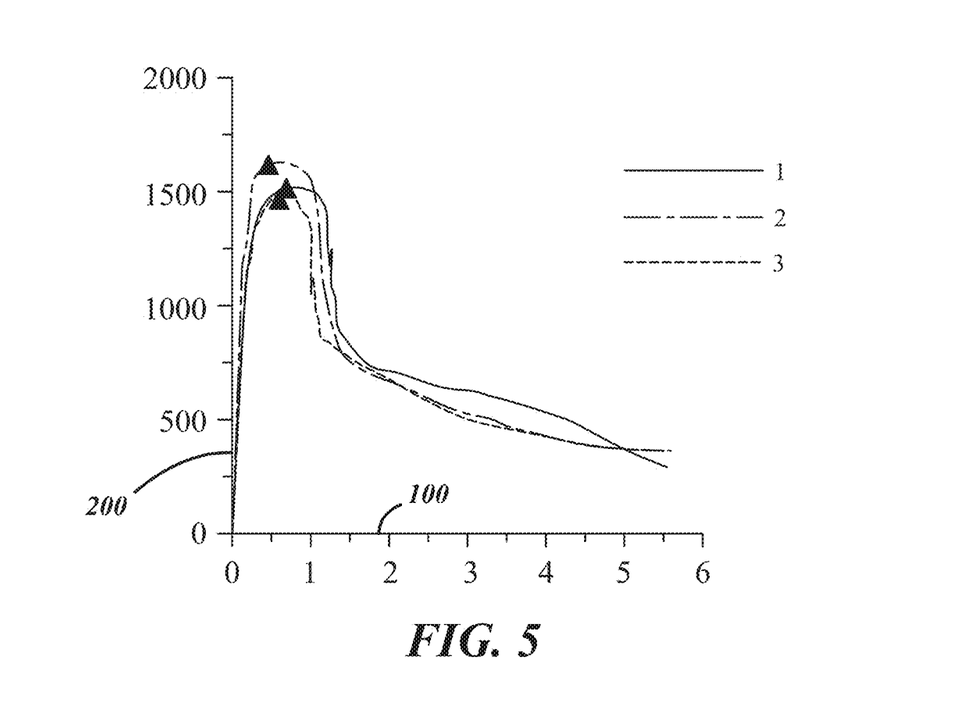
FIG. 5 is a line graph showing lap shear strength of three specimens of a workpiece stack-up with a pair of steel workpieces that each have a thickness of 0.4 millimeters (mm), with tensile extension in millimeters (mm) denoted on the X-axis and load in newtons (N) denoted on the Y-axis.
Figure 6:
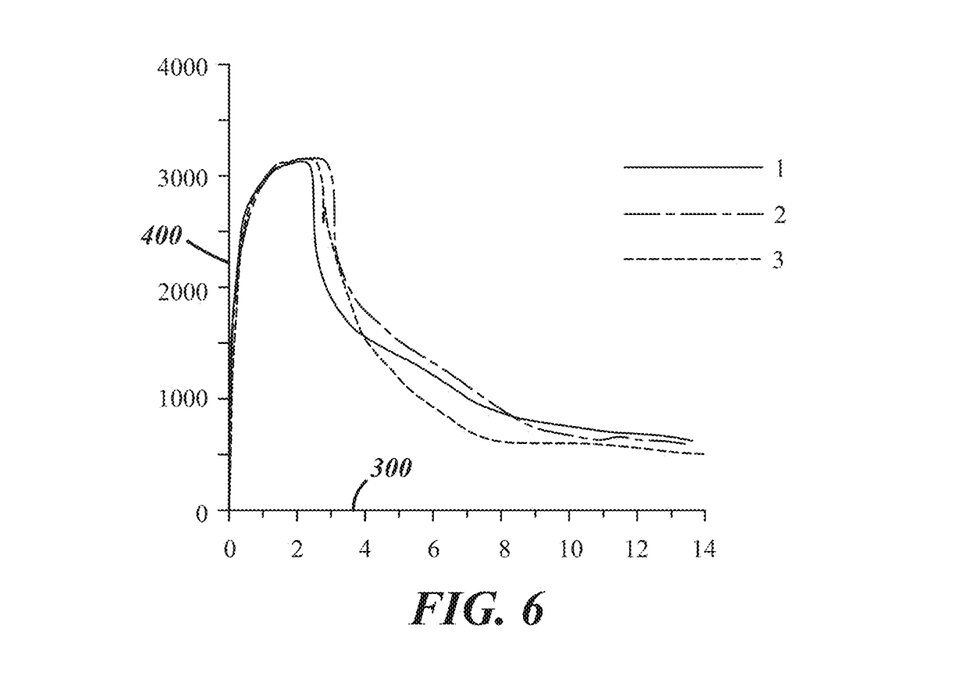
FIG. 6 is a line graph showing lap shear strength of three specimens of a workpiece stack-up with a pair of steel workpieces that each have a thickness of 0.6 millimeters (mm), with tensile extension in millimeters (mm) denoted on the X-axis and load in newtons (N) denoted on the Y-axis.

FIGS. 5 and 6 demonstrate consistent joint strength of brazed joints. In the line graph of FIG. 5, an X-axis 100 denotes tensile extension in millimeters (mm), and a Y-axis 200 denotes load in newtons (N) for the brazed joints under an applied quasi-static loading. Specimens 1 and 3 in FIG. 5 had a brazed joint established between a pair of steel workpieces composed of the low carbon steel designated GMW2 HD (hot-dipped galvanized coating). The steel workpieces each had a thickness of about 0.4 mm. Approximate process parameters executed for the brazed joints of specimens 1 and 3 included a welding electrode load of 360 pounds (lbs.), a welding time of twelve milliseconds (ms) at a welding current of 11-15 kiloamps (kA), and a welding time of eight ms at a welding current of 15 kA. Maximum load for specimen 1 was 1.53 kilonewtons (kN), and tensile extension at maximum load for specimen 1 was 0.56 mm; and maximum load for specimen 3 was 1.47 kN, and tensile extension at maximum load for specimen 3 was 0.53 mm. Specimen 2, on the other hand, lacked a brazed joint. Maximum load for specimen 2 was 1.64 kN, and tensile extension at maximum load for specimen 2 was 0.65 mm. In the line graph of FIG. 6, an X-axis 300 denotes tensile extension in millimeters (mm), and a Y-axis 400 denotes load in newtons (N). Specimens 1, 2, and 3 in FIG. 6 all had a brazed joint established between a pair of steel workpieces composed of the low carbon steel designated GMW2 HD (hot-dipped galvanized coating). The steel workpieces each had a thickness of about 0.6 mm. Approximate process parameters executed for the brazed joints of specimens 1, 2, and 3 included a welding electrode load of 360 pounds (lbs.), a welding time of twelve milliseconds (ms) at a welding current of 11-15 kiloamps (kA), and a welding time of eight ms at a welding current of 15 kA.

It is to be understood that the foregoing is a description of one or more aspects of the disclosure. The disclosure is not limited to the particular embodiment(s) disclosed herein, but rather is defined solely by the claims below. Furthermore, the statements contained in the foregoing description relate to particular embodiments and are not to be construed as limitations on the scope of the disclosure or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of resistance spot brazing a workpiece stack-up that includes a first thin-gauge steel workpiece and a second thin-gauge steel workpiece, the method comprising:
    applying a filler material to a first surface of the first thin-gauge steel workpiece at a braze site only;
    bringing the second thin-gauge steel workpiece to the first thin-gauge steel workpiece, a second surface of the second thin-gauge steel workpiece adjoining the filler material;
    clamping a first welding electrode and a second welding electrode in abutment to the first and second thin-gauge steel workpieces adjacent the filler material;
    passing electrical current between the first and second welding electrodes and through the first and second thin-gauge steel workpieces and through the filler material for 12 ms at 11 to 15 kA with a welding electrode load of 360 pounds; and
    terminating passage of the electrical current to establish a brazed joint at the braze site between the first and second thin-gauge steel workpieces, wherein the brazed joint comprises the filler material and the first and second thin-gauge steel workpieces,
    wherein the first thin-gauge steel workpiece has a thickness dimension that is less than 0.75 millimeters (mm), and the second thin-gauge steel workpiece has a thickness dimension that is less than 0.75 mm.

2. The method of claim 1, wherein applying the filler material involves coating the first surface of the first thin-gauge steel workpiece with the filler material via thermal spraying.

3. The method of claim 1, wherein applying the filler material involves layering the filler material on the first surface of the first thin-gauge steel workpiece via additive manufacturing.

4. The method of claim 3, wherein layering the filler material on the first surface of the first thin-gauge steel workpiece involves 3D printing.

5. The method of claim 1, wherein applying the filler material to the first surface of the first thin-gauge steel workpiece involves applying the filler material in a paste form.

6. The method of claim 1, wherein applying the filler material to the first surface of the first thin-gauge steel workpiece involves applying the filler material in a wire form.

7. The method of claim 1, wherein applying the filler material to the first surface of the first thin-gauge steel workpiece involves providing the filler material in shim form.

8. The method of claim 1, wherein the filler material is composed of a base metal material with a plurality of particles dispersed within the base metal material, the plurality of particles facilitating the application of the filler material to have a retained thickness dimension prior to establishment of the brazed joint.

9. The method of claim 1, wherein the plurality of particles facilitate a retained gap dimension between the first and second surfaces at the brazed joint as the first and second welding electrodes exert a clamping load thereat.

10. The method of claim 1, further comprising depositing a plurality of particles into a base metal material of the filler material, wherein the plurality of particles is dispersed within the base metal material.

11. The method of claim 10, wherein the plurality of particles is deposited into the base metal material after the filler material is applied to the first surface of the first thin-gauge steel workpiece and before the second surface of the second thin-gauge steel workpiece is adjoined with the filler material.

12. The method of claim 10, wherein depositing the plurality of particles into the base metal material of the filler material involves thermal spraying of the plurality of particles.

13. The method of claim 1, wherein the first welding electrode, the second welding electrode, or both of the first and second welding electrodes have a weld face with a radius of curvature that ranges between 25 millimeters (mm) and 50 mm.

14. A method of resistance spot brazing a workpiece stack-up, the method comprising:
    providing a first thin-gauge steel workpiece and a second thin-gauge steel workpiece at a braze site only;
    applying a filler material to a first surface of the first thin-gauge steel workpiece;
    depositing a plurality of particles into the applied filler material;
    adjoining a second surface of the second thin-gauge steel workpiece to the filler material;
    clamping a first welding electrode and a second welding electrode on the first and second thin-gauge steel workpieces adjacent the filler material, the plurality of particles facilitating a retained gap dimension at the filler material between the first and second surfaces as the first and second welding electrodes exert a clamping load thereat;
    passing electrical current between the first and second welding electrodes for 12 ms at 11 to 15 kA with a welding electrode load of 360 pounds; and
    terminating passage of the electrical current to establish a brazed joint at the braze site between the first and second thin-gauge steel workpieces wherein the brazed joint comprises the filler material and the first and second thin-gauge steel workpieces,
    wherein the first thin-gauge steel workpiece has a thickness dimension that is less than 0.75 millimeters (mm), and the second thin-gauge steel workpiece has a thickness dimension that is less than 0.75 mm.

15. The method of claim 14, wherein applying the filler material involves layering the filler material on the first surface of the first thin-gauge steel workpiece via additive manufacturing.

16. The method of claim 14, wherein applying the filler material to the first surface of the first thin-gauge steel workpiece involves applying the filler material in a paste form.

17. The method of claim 14, wherein applying the filler material to the first surface of the first thin-gauge steel workpiece involves applying the filler material in a wire form.

18. The method of claim 14, wherein depositing the plurality of particles into the applied filler material involves thermal spraying.

19. A method of resistance spot brazing a workpiece stack-up that includes a first thin-gauge steel workpiece and a second thin-gauge steel workpiece, the method comprising:
    applying a filler material to a first surface of the first thin-gauge steel workpiece at a braze site only by coating the first surface with the filler material via thermal spraying;
    depositing a plurality of particles into a base metal material of the filler material by thermal spraying, wherein the plurality of particles is dispersed within the base metal material, and wherein the plurality of particles is deposited into the base metal material after the filler material is applied to the first surface of the first thin-gauge steel workpiece and before the second surface of the second thin-gauge steel workpiece is adjoined with the filler material;
    bringing the second thin-gauge steel workpiece to the first thin-gauge steel workpiece, a second surface of the second thin-gauge steel workpiece adjoining the filler material, and wherein the first thin-gauge steel workpiece has a thickness dimension that is less than 0.75 millimeters (mm), and the second thin-gauge steel workpiece has a thickness dimension that is less than 0.75 mm;
    clamping a first welding electrode and a second welding electrode on the first and second thin-gauge steel workpieces adjacent the filler material, wherein the plurality of particles facilitate a retained gap dimension between the first and second surfaces as the first and second welding electrodes exert a clamping load thereat, and wherein the first welding electrode, the second welding electrode, or both of the first and second welding electrodes have a weld face with a radius of curvature that ranges between 25 millimeters (mm) and 50 mm;
    passing electrical current between the first and second welding electrodes and through the first and second thin-gauge steel workpieces and through the filler material for 12 ms at 11 to 15 kA with a welding electrode load of 360 pounds; and
    terminating passage of the electrical current to establish a brazed joint at the braze site between the first and second thin-gauge steel workpieces, wherein the brazed joint comprises the filler material and the first and second thin-gauge steel workpieces.

* * * * *